(12) United States Patent (10) Patent No.: US 12,292,785 B2
Ramanathan et al. (45) Date of Patent: May 6, 2025

(54) METHOD AND SYSTEM FOR AUTOMATICALLY SELECTING AND EXECUTING SOLUTIONS ON THE TARGET APPLICATION

(71) Applicant: JPMorgan Chase Bank, N.A., New York, NY (US)

(72) Inventors: Nachiappan Ramanathan, Bengaluru (IN); Rajesh Kumar, Bangalore (IN); Gurushant Tadasalur, Bangalore (IN); Bhupendra Raj, Thane (IN); Anik Chanda, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 95 days.

(21) Appl. No.: 18/134,313

(22) Filed: Apr. 13, 2023

(65) Prior Publication Data

US 2024/0193029 A1 Jun. 13, 2024

(30) Foreign Application Priority Data

Dec. 12, 2022 (IN) .............................. 202211071533

(51) Int. Cl.
*G06F 11/00* (2006.01)
*G06F 11/07* (2006.01)

(52) U.S. Cl.
CPC ........ *G06F 11/0772* (2013.01); *G06F 11/079* (2013.01); *G06F 11/0793* (2013.01)

(58) Field of Classification Search
CPC . G06F 11/0772; G06F 11/079; G06F 11/0793
See application file for complete search history.

(56) References Cited

U.S. PATENT DOCUMENTS

| | | | |
|---|---|---|---|
| 8,086,909 B1* | 12/2011 | Liu .................... | G06F 11/0778 714/39 |
| 9,069,737 B1* | 6/2015 | Kimotho ............. | G06F 11/079 |
| 9,904,587 B1* | 2/2018 | Potlapally ........... | G06F 11/079 |
| 2005/0038832 A1* | 2/2005 | Feigenbaum ....... | G06F 11/0748 |
| 2005/0240798 A1* | 10/2005 | Benedek .............. | G06F 11/079 714/E11.026 |
| 2011/0107137 A1* | 5/2011 | Lam .................... | G06F 11/0793 714/E11.023 |
| 2012/0204068 A1* | 8/2012 | Ye ....................... | G06F 11/0769 714/57 |
| 2016/0041864 A1* | 2/2016 | Yu ....................... | G06F 11/0772 714/57 |
| 2020/0174870 A1* | 6/2020 | Xu ...................... | G06F 11/0769 |
| 2020/0180148 A1* | 6/2020 | S Nanal ............. | G05B 19/0423 |
| 2020/0327005 A1* | 10/2020 | Singh ................... | G06F 11/302 |
| 2020/0327008 A1* | 10/2020 | Singh ................... | G06F 9/451 |

(Continued)

*Primary Examiner* — Joshua P Lottich
(74) *Attorney, Agent, or Firm* — GREENBLUM & BERNSTEIN, P.L.C.

(57) ABSTRACT

A method for automatically selecting and executing solutions on a target application is disclosed. The method includes: identifying at least one failure event associated with the target application based on monitoring of the target application; classifying each of the identified failure events as one from among a labeled failure event and an unlabeled failure event; selecting a recovery solution for the labeled failure event from at least one recovery database; and automatically executing the selected recovery solution on the target application for the labeled failure event.

15 Claims, 5 Drawing Sheets

(56) References Cited

U.S. PATENT DOCUMENTS

| | | | |
|---|---|---|---|
| 2020/0341834 A1* | 10/2020 | Safary | G06F 11/2257 |
| 2022/0019496 A1* | 1/2022 | Lozano | G06N 20/20 |
| 2023/0122653 A1* | 4/2023 | Yoshida | G06F 11/0706 |
| | | | 714/37 |

* cited by examiner

METHOD AND SYSTEM FOR AUTOMATICALLY SELECTING AND EXECUTING SOLUTIONS ON THE TARGET APPLICATION

CROSS-REFERENCE TO RELATED APPLICATIONS

This application claims priority benefit from Indian Application No. 202211071533, filed Dec. 12, 2022 in the India Patent Office, which is hereby incorporated by reference in its entirety.

FIELD OF THE DISCLOSURE

This technology generally relates to methods and systems for identifying and handling failure events for the applications, and more particularly to methods and systems for automatically selecting and executing solutions on the target application.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

As is generally known, several organizations use software applications for the operation of various tasks. The designing and functioning of any high-level application are time-consuming and challenging processes for the application development team. These software applications may have errors and/or exceptions or bugs that hinder the operation of processes during the execution of the erroneous software applications. In order to avoid failure of the application, the application development team receives an alert for any failure of the application based on the monitoring of the application at various layers. When an error is encountered while running the application, the solutions for the known failures/errors are to be recovered as developed by the application development team. The same is done by manually identifying the failure/error in the application and then analyzing the same. After analysis of the error, the application development team works on the identification of the solution and then proceeds to execute the solution and resolve the errors or failure issues.

One drawback of the conventional process of fixing failure/errors in applications by the application development team is the excessive consumption of time. The whole process from the identification of the solution by the application development team to the resolution of the failure event by the application development team takes a significant amount of time that can be better invested in more critical issues. This is mainly because the failure detection and execution of the solution are mapped one-on-one manually. It is important for the application development team to save time by not spending it on identifying each failure event, selecting the right solution, and then mapping them manually. It is evident that the solution may not work in case there is a change in the system or the application.

Hence, in view of these and other existing limitations, there arises an imperative need to provide an efficient solution to overcome the above-mentioned limitations and to provide a method and system for automatically selecting and executing solutions on the target application.

SUMMARY

The present disclosure, through one or more of its various aspects, embodiments, and/or specific features or sub-components, provides, inter alia, various systems, servers, devices, methods, media, programs, and platforms for automatically selecting and executing solutions on the target application.

According to an aspect of the present disclosure, a method for automatically selecting and executing solutions on a target application is disclosed. The method is implemented by at least one processor. The method may include identifying, by the at least one processor, at least one failure event associated with the target application based on monitoring of the target application; classifying, by the at least one processor, each of the identified at least one failure event as one from among a labeled failure event and an unlabeled failure event; selecting, by the at least one processor, at least one recovery solution for the labeled failure event from at least one recovery database; and automatically executing, by the at least one processor, the selected at least one recovery solution on the target application for the labeled failure event.

In accordance with an exemplary embodiment, each of the identified at least one failure event may be classified as one from among the labeled failure event and the unlabeled failure event based on an output of a machine learning model.

In accordance with an exemplary embodiment, the method may further include: selecting, by the at least one processor, at least one possible recovery solution for the unlabeled failure event from the at least one recovery database; testing and executing, by the at least one processor, the selected at least one possible recovery solution on the target application; and labeling the selected at least one possible recovery solution on the target application for the unlabeled failure event based on a successful result of the testing and execution of the selected at least one possible recovery solution on the target application.

In accordance with an exemplary embodiment, the selected at least one recovery solution for the labeled failure event may be executed without a manual intervention for a resolution of the labeled failure event, and the resolution of the labeled failure event may occur automatically based on the selected at least one recovery solution.

In accordance with an exemplary embodiment, the selected at least one possible recovery solution for the unlabeled failure event may require a manual intervention for a resolution of the unlabeled failure event, and the resolution of the unlabeled failure event may occur based on a result of the testing and the labeling of the selected at least one possible recovery solution, wherein the manual intervention corresponds to the testing and the labeling of the selected at least one possible recovery solution based on a user input.

In accordance with an exemplary embodiment, each of the at least one failure event may be identified based on at least one from among missing data, a crashing of an application, a delay in the system, and inaccurate results.

According to an aspect of the present disclosure, a computing device configured to implement an execution of a method for automatically selecting and executing solutions on a target application is disclosed. The computing device includes a processor; a memory; and a communication interface coupled to each of the processor and the memory. The processor may be configured to: identify at least one failure event associated with the target application based on monitoring of the target application; classify each of the identified at least one failure event as one from among a labeled failure event and an unlabeled failure event; select at least one recovery solution for the labeled failure event from at least one recovery database; and automatically execute the selected at least one recovery solution on the target application for the labeled failure event.

In accordance with an exemplary embodiment, each of the identified failure event may be classified as one from among the labeled failure event and the unlabeled failure event based on an output of a machine learning model.

In accordance with an exemplary embodiment, the processor may be further configured to: select at least one possible recovery solution for the unlabeled failure event from the at least one recovery database; test and execute the selected at least one possible recovery solution on the target application; and label the selected at least one possible recovery solution on the target application for the unlabeled failure event based on a successful result of the testing and execution of the selected at least one possible recovery solution on the target application.

In accordance with an exemplary embodiment, the selected at least one recovery solution for the labeled failure event may be executed without a manual intervention for a resolution of the labeled failure event, and the resolution of the labeled failure event may occur automatically based on the selected at least one recovery solution.

In accordance with an exemplary embodiment, the selected at least one possible recovery solution for the unlabeled failure event may require a manual intervention for a resolution of the unlabeled failure event, and the resolution of the labeled failure event may occur based on a result of the testing and the labeling of the selected at least one possible recovery solution, wherein the manual intervention corresponds to the testing and the labeling of the selected at least one possible recovery solution based on a user input.

In accordance with an exemplary embodiment, each of the at least one failure event may be identified based on at least one from among missing data, a crashing of an application, a delay in the system, and inaccurate results.

According to an aspect of the present disclosure, a non-transitory computer readable storage medium storing instructions for automatically selecting and executing solutions on a target application is disclosed. The instructions include executable code which, when executed by a processor, may cause the processor to: identify at least one failure event associated with the target application based on monitoring of the target application; classify each of the identified at least one failure event as one from among a labeled failure event and an unlabeled failure event; select at least one recovery solution for the labeled failure event from at least one recovery database; and automatically execute the selected at least one recovery solution on the target application for the labeled failure event.

In accordance with an exemplary embodiment, each of the identified at least one failure event may be classified as one from among the labeled failure event and the unlabeled failure event based on an output of a machine learning model.

In accordance with an exemplary embodiment, when executed by the processor, the executable code may further cause the processor to: select at least one possible recovery solution for the unlabeled failure event from the at least one recovery database; test and execute the selected at least one possible recovery solution on the target application; and label the selected at least one possible recovery solution on the target application for the unlabeled failure event based on a successful result of the testing and execution of the selected at least one possible recovery solution on the target application.

In accordance with an exemplary embodiment, the selected at least one recovery solution for the labeled failure event may be executed without a manual intervention for a resolution of the labeled failure event, and a resolution of the labeled failure event may occur automatically based on the selected at least one recovery solution.

In accordance with an exemplary embodiment, the selected at least one possible recovery solution for the unlabeled failure event may require a manual intervention for a resolution of the unlabeled failure event, and the resolution of the unlabeled failure event may occur based on a result of the testing and the labeling of the selected at least one possible recovery solution, wherein the manual intervention corresponds to the testing and the labeling of the selected at least one possible recovery solution based on a user input.

In accordance with an exemplary embodiment, each of the at least one failure event may be identified based on at least one from among missing data, a crashing of an application, a delay in the system, and inaccurate results.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
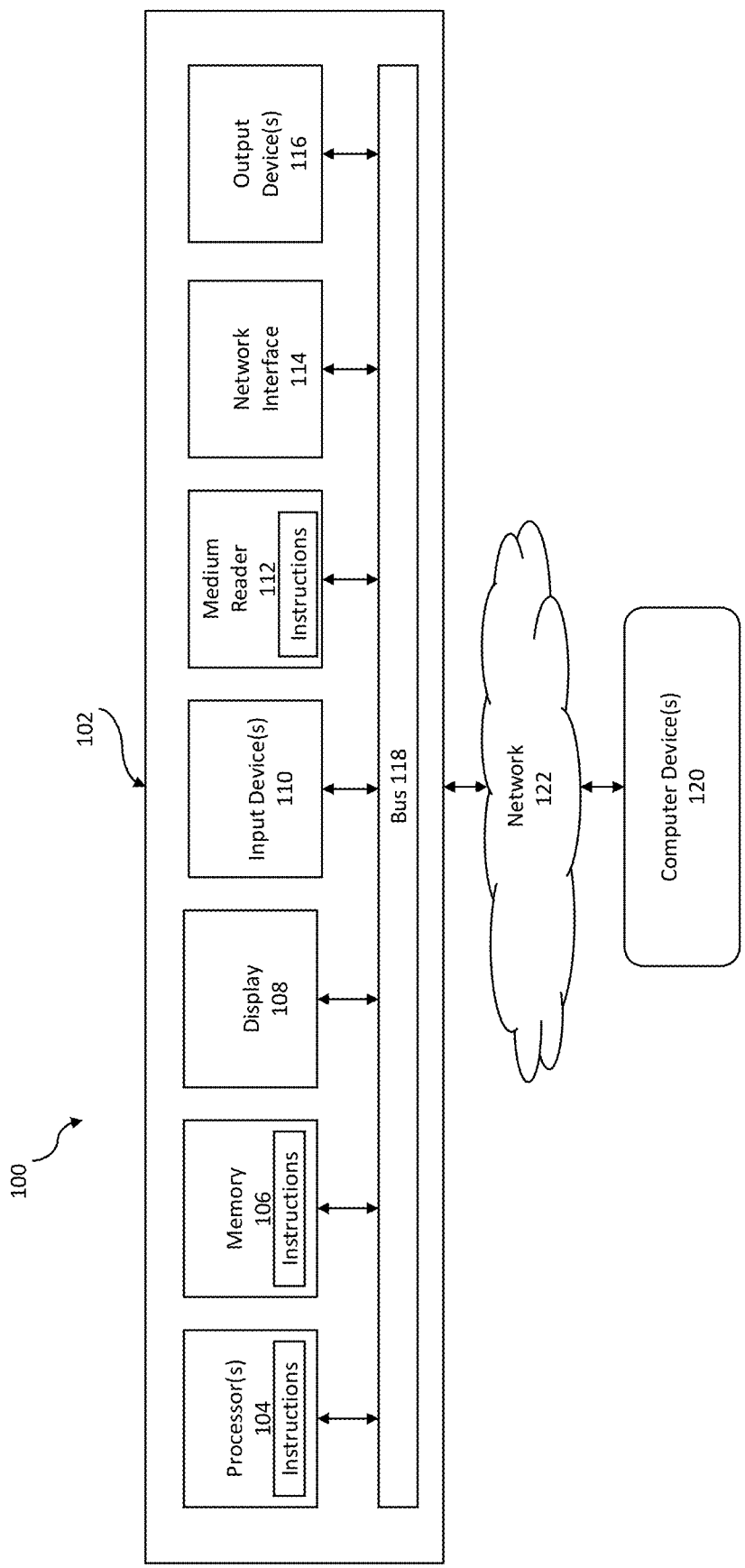
FIG. 1 illustrates an exemplary computer system.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units/controller described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

To overcome the problems associated with excessive consumption of time and resources by the application development team on the commonly occurring or known failure/errors, the present disclosure provides a method and system for automatically selecting and executing solutions on a target application. The system first identifies at least one failure event associated with the target application based on the monitoring of the target application. The failure event is identified based on the missing data, crashing of the application, delay in the system, inaccurate results, and the like. In an example, the system identifies the type of the failure event/error and then selects the right solution from the database and automatically executes it on the application for resolution of the labeled and known errors. Further, the system is customized to identify and suggest the possible solution for the resolution of the unlabeled and unknown errors/failure events. The system is capable and configured to identify the failure/error of any type and format.

The system is configured to classify the identified failure event as one of the labeled events or an unlabeled event. The classification of the same is done based on a trained model such as using a machine learning (ML) model. If the failure event is the labeled event, then the system is configured to select at least one recovery solution from the recovery database. Then, the system automatically executes the selected recovery solution on the target application for the classified labeled failure event. However, in case the failure event is the unlabeled event, then the system is configured to identify at least one possible recovery solution from the database. The possible recovery solution includes but is not limited to the solutions available from the past occurrences or events present in the ML model or the system. However, the identified solution is tested by the user for such a failure event and then executed on the target application. In an event, the identified solution is successfully executed by the user, then the user labels the identified solution as a recovery solution for the future purposes as well. From the above, it can be noted that the recovery solution for the labeled event is executed without the manual intervention for the resolution of the failure event and is resolved automatically based on the selected recovery solution. However, the possible recovery solution for the unlabeled event requires manual intervention (user input) for the resolution of the failure event and is resolved based on the testing and the labeling of the selected possible recovery solution by the user. After the successful testing, the unlabeled event is classified as the labeled event by the user for the future purposes as well.

In an example, one of the processes in the Application A has crashed and therefore, a failure event has been generated by the monitoring tool. As per the background, the support team would get an alert/ticket regarding the generation of the failure event. Thereafter, someone from the support team investigates the alert and takes appropriate action to resolve the issue and recover the process of Application A. However, this process is a time-consuming process and therefore, is not recommended. Similarly, in the agent-based recovery approach, the agent would be called to execute the pre-deployed and mapped recovery solution on the target application. However, if the recovery procedure were not placed in advance on the target application, the end-to-end auto recovery would fail. Also, the recovery solution needs to be manually deployed/updated on the target application in case of any change in the target application. Therefore, the conventional solution is also cumbersome and is not recommended. Therefore, as per the solution of the present invention, the system is configured to check the database and then select the right solution X for the failure event. The recovery solution X is then deployed and executed on the target application A. The solution X proposed herein is one of the labeled data event. In case the process of the Application A is unlabeled, then the present invention identifies the most suitable solution Y for the failure event based on the past events. Then, the system is updated with the solution Y for the future usage. Thus, the present system or device is customizable as per the type of the failure event/error.

Therefore, the present disclosure aids in freeing up the capacity of the application development team to focus on the new, advanced, and complex failure events/errors. Thus, the present system increases the efficiency of the system and team to resolve a large number of failure events/errors in a given time period. Further, the implementation of the features of the present disclosure results in achieving a better efficiency owing to various factors as has been explained hereinbelow and which will become evident to a person skilled in the art, the factors including but not limited to agentless implementation, easy to integrate with the existing monitoring systems, seamless integration of the automatic recovery solutions for the existing monitoring tools, simple and quick to adopt, reuse of the existing solutions, easy to impose the changes in case of any change in the application, flexibility for the users to use the present invention according to their customized requirement, the present solution is platform agnostic and can be adapted to any type of recoveries, ensuring the high availability of the system, avoiding duplication of effort in recovering the same kind of failure events across multiple systems, simplifying the cause of the failure event and the like.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, a failure event is an event generated based on one or more errors that are encountered by an application, operating system, or server during operation. Also, a failure event can be defined as a bug in a program that causes the application or the process to operate incorrectly.

As used herein, a recovery database is an organized collection of structured information or data or recovery solutions, typically stored electronically in a computer system.

As used herein, a labeled event is a sequence of events that are identified by a software application based on past solutions, pre-deployed events, and mapped recovery solutions.

As used herein, an unlabeled event is a sequence of events that are not identified by a software application based on past and pre-deployed solutions.

As used herein, a target application refers to an application targeted for the resolution or fixing of at least one failure event to operate the application in a correct and desired manner.

As illustrated in FIG. 1, the computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Bluray disk, or any other form of storage medium known in the art. Memories may be volatile or non-volatile, secure and/or encrypted, unsecure and/or unencrypted. As regards the present invention, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically selecting and executing solutions on a target application.

Figure 2:
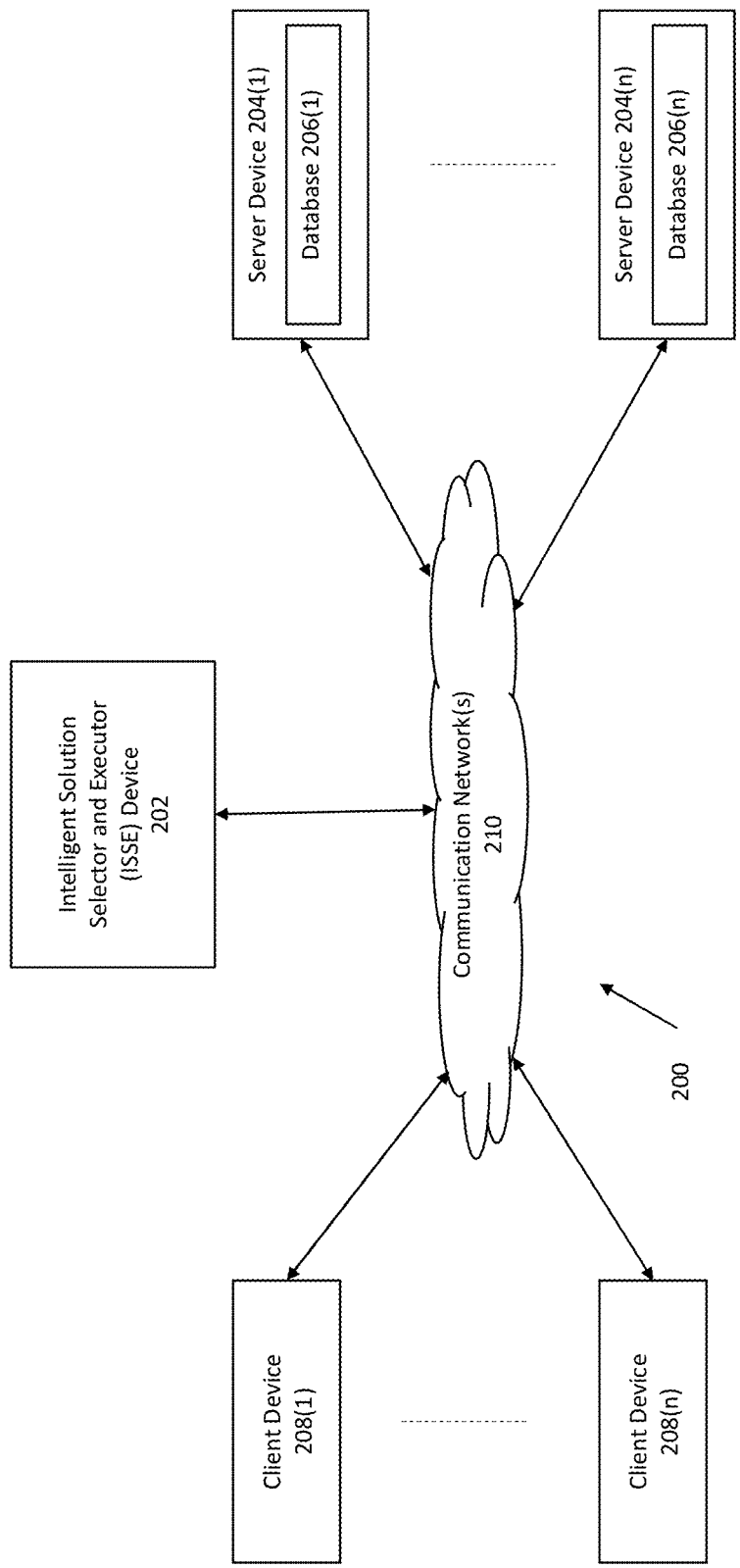
FIG. 2 illustrates an exemplary diagram of a network environment.

Referring to FIG. 2, a schematic of an exemplary network environment 200 for implementing a method for automatically selecting and executing solutions on a target application is illustrated. In an exemplary embodiment, the method is executable on any networked computer platform, such as, for example, a personal computer (PC).

The method for automatically selecting and executing solutions on a target application may be implemented by an Intelligent Solution Selector and Executor (ISSE) device 202. The ISSE device 202 may be the same or similar to the computer system 102 as described with respect to FIG. 1. The ISSE device 202 may store one or more applications that can include executable instructions that, when executed by the ISSE device 202, cause the ISSE device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as virtual machine(s) or virtual server(s) that may be managed in a cloud-based computing environment. Also, the application(s), and even the ISSE device 202 itself, may be located in virtual server(s) running in a cloud-based computing environment rather than being tied to one or more specific physical network computing devices. Also, the application(s) may be running in one or more virtual machines (VMs) executing on the ISSE device 202. Additionally, in one or more embodiments of this technology, virtual machine(s) running on the ISSE device 202 may be managed or supervised by a hypervisor.

In the network environment 200 of FIG. 2, the ISSE device 202 is coupled to a plurality of server devices 204(1)-204(n) that hosts a plurality of databases 206(1)-206(n), and also to a plurality of client devices 208(1)-208(n) via communication network(s) 210. A communication interface of the ISSE device 202, such as the network interface 114 of the computer system 102 of FIG. 1, operatively couples and communicates between the ISSE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ISSE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer-readable media, and ISSE devices that efficiently implement a method for automatically selecting and executing solutions on a target application based on the category/cluster of failure events.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), Public Switched Telephone Network (PSTNs), Ethernet-based Packet Data Networks (PDNs), combinations thereof, and the like.

The ISSE device 202 may be a standalone device or integrated with one or more other devices or apparatuses, such as one or more of the server devices 204(1)-204(n), for example. In one particular example, the ISSE device 202 may include or be hosted by one of the server devices 204(1)-204(n), and other arrangements are also possible. Moreover, one or more of the devices of the ISSE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the ISSE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to failure events, labeled events, unlabeled events, recovery solutions, possible recovery solutions, software programs, machine learning models.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ISSE device 202 via communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ISSE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ISSE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ISSE device 202, the server devices 204(1)-204(n), or the client devices 208(1)-208(n), for example, may be configured to operate as virtual instances on the same physical machine. In other words, one or more of the ISSE device 202, the server devices 204(1)-204(n), or the client devices 208(1)-208(n) may operate on the same physical device rather than as separate devices communicating through communication network(s) 210. Additionally, there may be more or fewer ISSE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
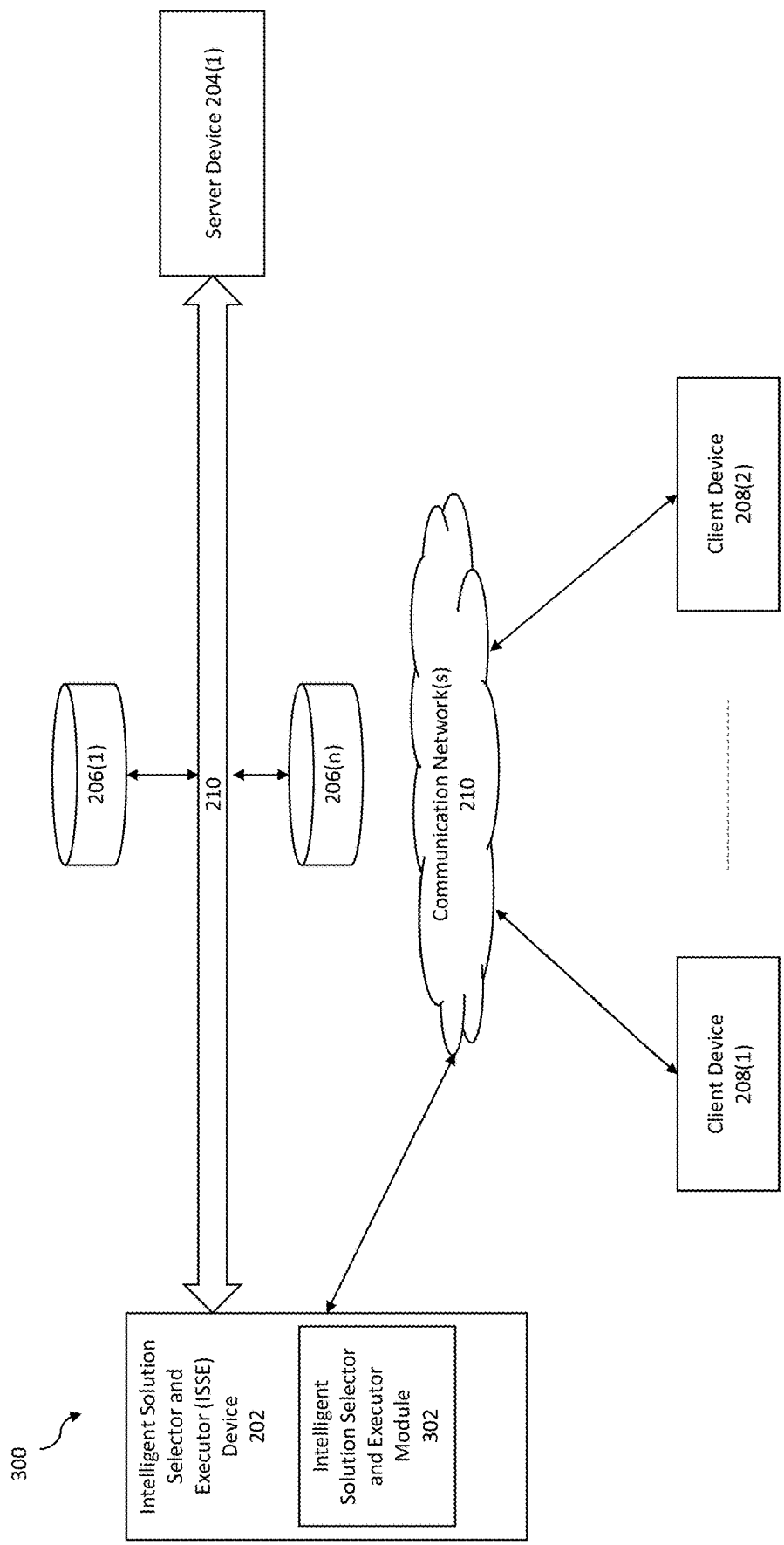
FIG. 3 shows an exemplary system for implementing a method for automatically selecting and executing solutions on a target application, in accordance with an embodiment of the present disclosure.

FIG. 3 illustrates an exemplary system for implementing a method for automatically selecting and executing solutions on a target application, in accordance with an embodiment of the present disclosure. As illustrated in FIG. 3, according to exemplary embodiments, the system 300 may comprise an ISSE device 202 including an ISSE module 302 that may be connected to a server device 204(1) and one or more repository 206(1) 206(n) via a communication network 210, but the disclosure is not limited thereto.

The ISSE device 202 is described and shown in FIG. 3 as including an Intelligent Solution Selector and Executor module 302, although it may include other rules, policies, modules, databases, or applications, for example. As will be described below, the Intelligent Solution Selector and Executor module 302 is configured to implement a method for automatically selecting and executing solutions on a target application.

An exemplary process 300 for implementing a mechanism for automatically selecting and executing solutions on a target application by utilizing the network environment of FIG. 2 is shown as being executed in FIG. 3. Specifically, a first client device 208(1) and a second client device 208(2) are illustrated as being in communication with ISSE device 202. In this regard, the first client device 208(1) and the second client device 208(2) may be "clients" of the ISSE device 202 and are described herein as such. Nevertheless, it is to be known and understood that the first client device 208(1) and/or the second client device 208(2) need not necessarily be "clients" of the ISSE device 202, or any entity described in association therewith herein. Any additional or alternative relationship may exist between either or both of the first client device 208(1) and the second client device 208(2) and the ISSE device 202, or no relationship may exist.

Further, ISSE device 202 is illustrated as being able to access the one or more repositories 206(1) . . . 206(n). The Intelligent Solution Selector and Executor module 302 may be configured to access these repositories/databases for implementing a method for providing automatic selection and execution of recovery solutions for the classified labeled failure event.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ISSE device 202 via broadband or cellular communication. Of course, these embodiments are merely exemplary and are not limiting or exhaustive.

Figure 4:
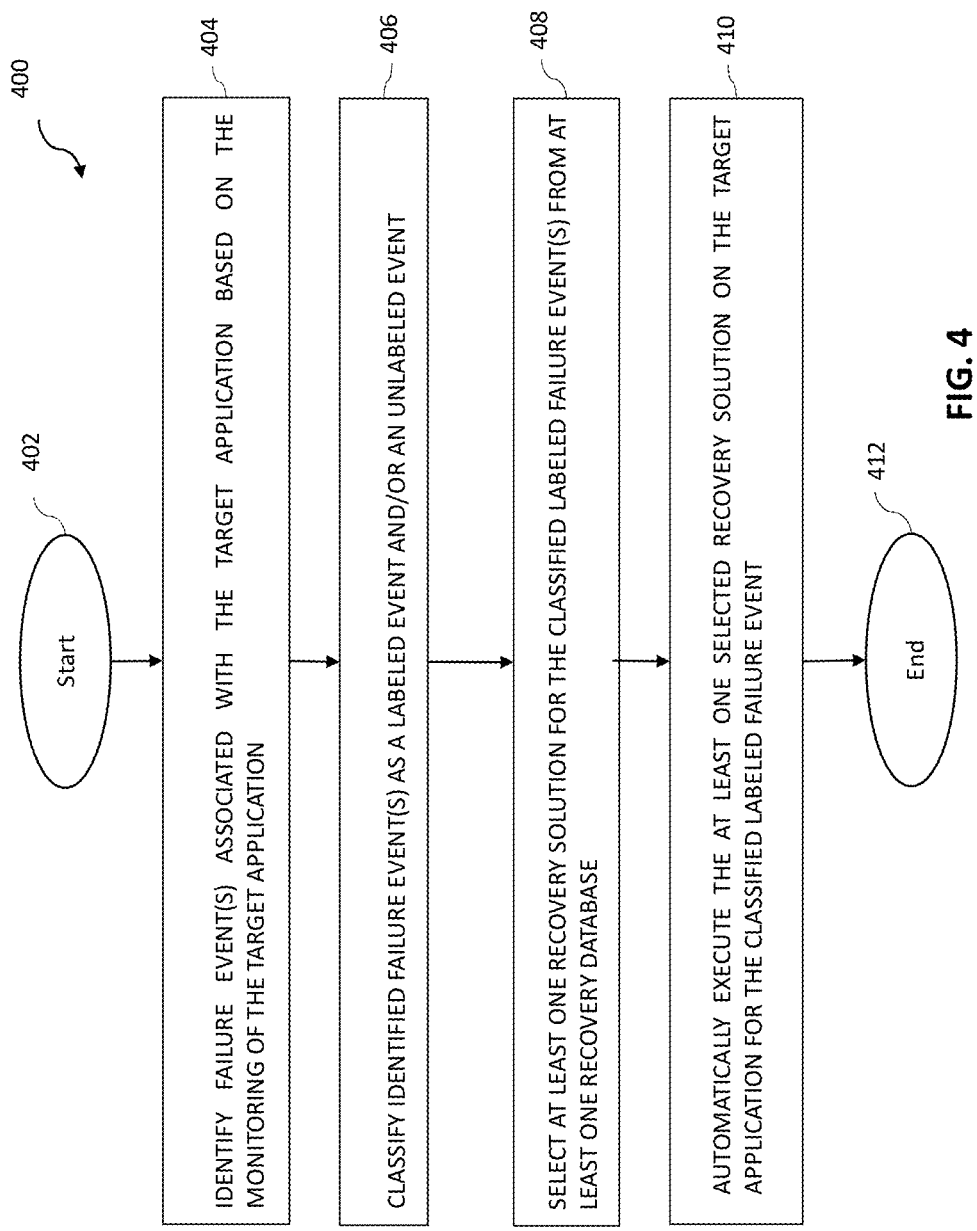
FIG. 4 illustrates an exemplary method flow diagram for automatically selecting and executing solutions on a target application, in accordance with an embodiment of the present disclosure.

Referring to FIG. 4, an exemplary method is shown for automatically selecting and executing solutions on a target application, in accordance with an embodiment of the present disclosure. As shown in FIG. 4, the method begins at step following a need to select and execute the solutions on a target application arises.

At step [404], the method comprises identifying, by the at least one processor via a communication interface, at least one failure event associated with the target application based on the monitoring of the target application. In a non-limiting embodiment, at least one failure event is identified based on missing data, crashing of an application, delay in the system, inaccurate results, and the like. In an example, Application A got crashed and therefore, the system generates a failure event corresponding to the crashing of the application.

At step [406], the method comprises classifying, by at least one processor, the identified failure event as one of a labeled event and an unlabeled event. In a non-limiting embodiment, the identified failure event is classified as one of the labeled events and the unlabeled events based on a machine learning model. In an exemplary embodiment, machine learning may include supervised learning algorithms such as, for example, k-medoids analysis, regression analysis, decision tree analysis, random forest analysis, k-nearest neighbors' analysis, logistic regression analysis, K-fold cross-validation analysis, balanced class weight analysis, etc.

At step [408], the method comprises selecting, by the at least one processor, at least one recovery solution for the classified labeled failure event from at least one recovery database. In a non-limiting embodiment, the at least one recovery solution for the unlabeled event is identified by selecting, by the at least one processor, at least one possible recovery solution for the classified unlabeled failure event from at least one recovery database; testing and executing, via the at least one processor, the at least one selected possible recovery solution on the target application; and labeling the at least one selected possible recovery solution on the target application for the classified unlabeled failure event based on the successful testing and execution of the at least one selected possible recovery solution on the target application. In an exemplary embodiment of the present disclosure, if the recovery solution for the crashing of the Application A is not present in the recovery database, then the system identifies the best possible solution from the database based on the past events. The solution identified is tested, executed and then labeled for future usage.

At step [410], the method comprises automatically executing, by the at least one processor, the at least one selected recovery solution on the target application on the classified labeled failure event. In a non-limiting embodiment, at least one recovery solution for the labeled event is executed without the manual intervention for the resolution of the failure event and is resolved automatically based on the selected recovery solution. Further, at least one possible recovery solution for the unlabeled event requires manual intervention for the resolution of the failure event and is resolved based on the testing and the labeling of the selected possible recovery solution, wherein the manual intervention corresponds to the testing and the labeling of the selected possible recovery solution based on the user input. After resolving and/or fixing the failure events, the method terminates at step [412].

Figure 5:
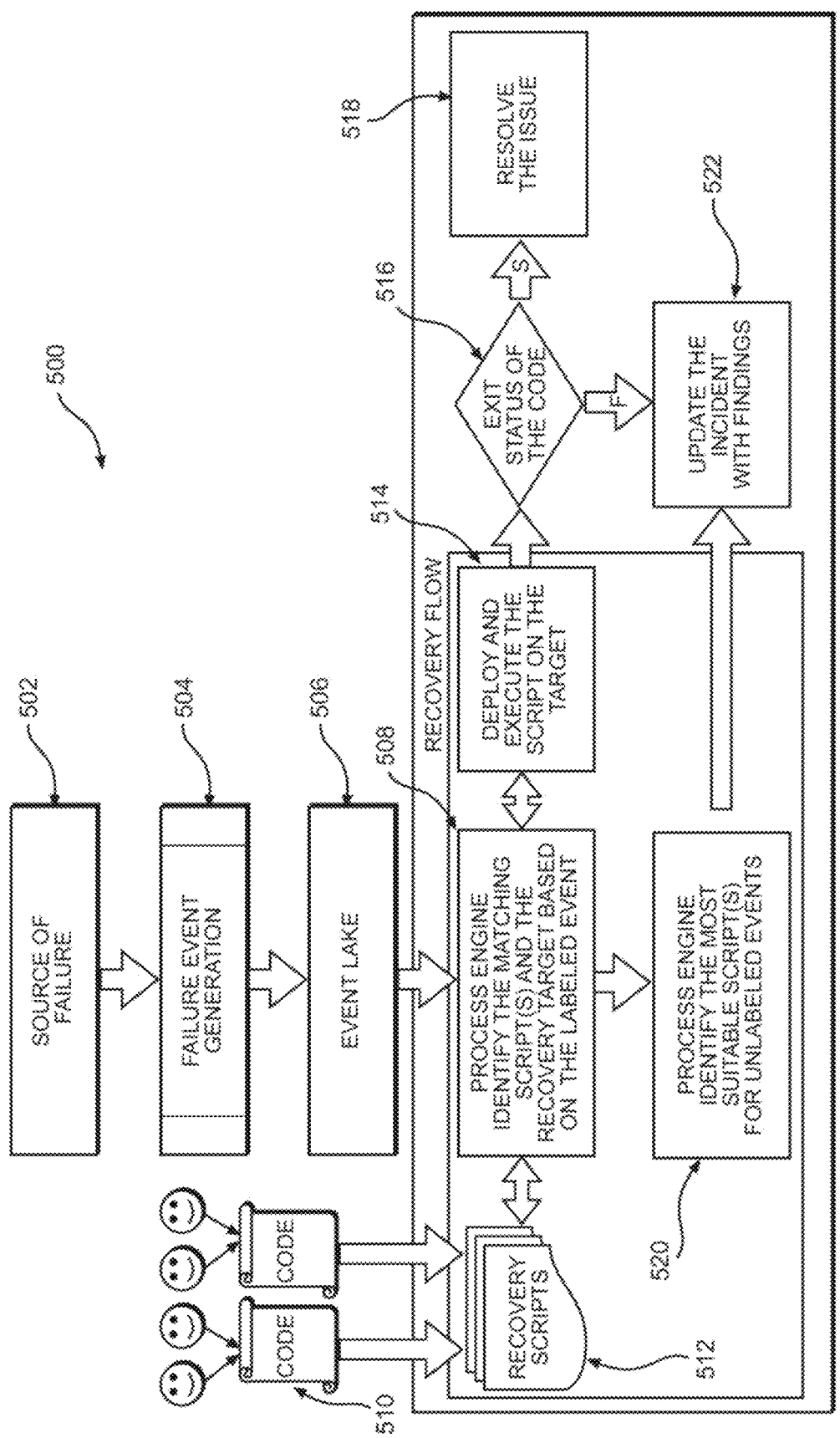
FIG. 5 is a diagram that illustrates a process flow usable for implementing a method for automatically selecting and executing solutions on a target application, in accordance with an embodiment of the present disclosure.

FIG. 5 is a diagram that illustrates a process flow usable for implementing a method for automatically selecting and executing solutions on a target application, in accordance with an embodiment of the present disclosure. At steps and [504], the process flow 500 begins with the identification of source of the failure associated with the target application and then the generation of a failure event associated with a target application. At step [506], the generated failure event is then sent to the event lake and is stored in the event lake. Further, at step [508], the system is configured to identify the recovery solution for the labeled event associated with the target application. At steps and [512], the recovery solution is identified and fetched from the recovery database. The recovery database has all the recovery solutions associated with the corresponding failure events. At step [514], once the recovery solution is identified for the labeled event, then the same is deployed and automatically executed on the target application. Lastly, at steps and [518], the process is terminated, and the failure event is resolved accordingly. However, at step [520], if the failure event is an unlabeled event, then the system identifies the most suitable recovery solution from the recovery database. The process then moves to the next step, wherein the recovery solution is tested by the user and then executed on the target application and the failure event is accordingly resolved based on the user input. Finally, at step [522], the recovery database is updated with the solution and the corresponding failure event.

In an example, a particular set of data is required to pass through multiple systems for the reconciliation and regularity reporting and the set of data gets processed in the system within the cut-off time. Any delay/issue in any of the systems would impact the final delivery of the set of the data to the concerned authority which may attract heavy penalties and/or put any organization or multinational company to reputational risk. In the background, the production support team would manually check for the arrival of the data at each system level from the supplier within the prescribed timeline. If it is not arrived, the consumers of the data would reach out to the suppliers to get the data/reason for the delay. Based on the response, the support team is required to take further action(s). Also, in the background, the production support team at each system may be alerted by the monitoring tools on the missing data within the cut-off time. Based on the alert, the production support team may reach out to their upstream data supplier to get further information on the missing data and then take necessary steps accordingly. However, as per the present disclosure, as soon as the monitoring team identifies the missing data, it would generate a failure event. The system identifies the event as the labeled data event and selects an appropriate action from the code repository (recovery database) and executes it on the target application to perform the follow-up action automatically and not manually. In case the data is unlabeled, the system identifies the most possible solution available in the code repository and suggests the solution in the failure event ticket. This helps the production support team to test the suggested solutions and label them for future usage. Thus, the failure event/error in the application that occurred during the operation of the application gets resolved quickly and automatically.

Accordingly, with this technology, an optimized process for automatically selecting and executing solutions on a target application is disclosed. As evident from the above disclosure, the present solution provides significant technical advancement over the existing solutions by automatically selecting and executing solutions on a target application associated with the failure labeled event and failure unlabeled event. Further, the automatic resolution of common and known failure events/errors in the target application saves a significant amount of time of the application development team of any organization which can be used in resolving complex issues/errors. Therefore, as disclosed in the present disclosure, the present invention is helpful and increases the efficiency of the system and the application development team. Therefore, the present disclosure achieves agentless implementation, easy to integrate with the existing monitoring systems, seamless integration of the automatic recovery solutions for the existing monitoring tools, simple and quick to adopt, reuse of the existing solutions, easy to impose the changes in case of any change in the application, flexibility for the users to use the present invention according to their customized requirement, and the like as referred in detail in para [0043].

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer readable storage medium storing instruction for automatically selecting and executing solutions on a target application is disclosed. The storage medium including executable code which, when executed by a processor, may cause the processor to identify at least one failure event associated with the target application based on the monitoring of the target application. Further, at least one failure event is identified based on missing data, crashing of an application, delay in the system, inaccurate results, and the like. The processor is configured to classify the identified failure event as one of a labeled event and an unlabeled event based on a machine learning model; and select at least one recovery solution for the classified labeled failure event from at least one recovery database. The processor is configured to identify the at least one recovery solution for the unlabeled event by selecting at least one possible recovery solution for the classified unlabeled failure event from at least one recovery database; testing and executing the at least one selected possible recovery solution on the target application; and labeling the at least one selected possible recovery solution on the target application for the classified unlabeled failure event based on the successful testing and execution of the at least one selected possible recovery solution on the target application by the user.

In an embodiment of the present disclosure, the processor is configured to automatically execute at least one selected recovery solution on the target application for the classified labeled failure event. The at least one recovery solution for the labeled event is executed without the manual intervention for the resolution of the failure event and is resolved automatically based on the selected recovery solution. Also, the at least one possible recovery solution for the unlabeled event requires manual intervention for the resolution of the failure event and is resolved based on the testing and the labeling of the selected possible recovery solution, wherein the manual intervention corresponds to the testing and the labeling of the selected possible recovery solution based on the user input.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically selecting and executing solutions on a target application, the method being implemented by at least one processor, the method comprising:

identifying, by the at least one processor, at least one failure event associated with the target application based on monitoring of the target application;

classifying, by the at least one processor, each of the identified at least one failure event as one from among a labeled failure event and an unlabeled failure event;

selecting, by the at least one processor, at least one recovery solution for the labeled failure event from at least one recovery database; and automatically executing, by the at least one processor, the selected at least one recovery solution on the target application for the labeled failure event, wherein the method further comprises:

selecting, by the at least one processor, at least one possible recovery solution for the unlabeled failure event from the at least one recovery database;

testing and executing, by the at least one processor, the selected at least one possible recovery solution on the target application; and labeling, by the at least one processor, the selected at least one possible recovery solution on the target application for the unlabeled failure event based on a successful result of the testing and execution of the selected at least one possible recovery solution on the target application.

2. The method as claimed in claim 1, wherein each of the identified at least one failure event is classified as one from among the labeled failure event and the unlabeled failure event based on an output of a machine learning model.

3. The method as claimed in claim 1, wherein the selected at least one recovery solution for the labeled failure event is executed without a manual intervention for a resolution of the labeled failure event, and the resolution of the labeled failure event occurs automatically based on the selected at least one recovery solution.

4. The method as claimed in claim 1, wherein the selected at least one possible recovery solution for the unlabeled failure event requires a manual intervention for a resolution of the unlabeled failure event, and the resolution of the unlabeled failure event occurs based on a result of the testing and the labeling of the selected at least one possible recovery solution, wherein the manual intervention corresponds to the testing and the labeling of the selected at least one possible recovery solution based on a user input.

5. The method as claimed in claim 1, wherein each of the at least one failure event is identified based on at least one from among missing data, system delay, and inaccurate results.

6. A computing device configured to implement an execution of a method for automatically selecting and executing solutions on a target application, the computing device comprising:

a processor;

a memory; and a communication interface coupled to each of the processor and the memory, wherein the processor is configured to:

identify at least one failure event associated with the target application based on monitoring of the target application;

classify each of the identified at least one failure event as one from among a labeled failure event and an unlabeled failure event;

select at least one recovery solution for the labeled failure event from at least one recovery database; and automatically execute the selected at least one recovery solution on the target application for the labeled failure event, wherein the processor is further configured to:

select at least one possible recovery solution for the unlabeled failure event from the at least one recovery database;

test and execute the selected at least one possible recovery solution on the target application; and label the selected at least one possible recovery solution on the target application for the unlabeled failure event based on a successful result of the testing and execution of the selected at least one possible recovery solution on the target application.

7. The computing device as claimed in claim 6, wherein each of the identified at least one failure event is classified as one from among the labeled failure event and the unlabeled failure event based on output of a machine learning model.

8. The computing device as claimed in claim 6, wherein the selected at least one recovery solution for the labeled failure event is executed without a manual intervention for a resolution of the labeled failure event, and the resolution of the labeled failure event occurs automatically based on the selected at least one recovery solution.

9. The computing device as claimed in claim 6, wherein the selected at least one possible recovery solution for the unlabeled failure event requires a manual intervention for a resolution of the unlabeled failure event, and the resolution of the unlabeled failure event occurs based on a result of the testing and the labeling of the selected at least one possible recovery solution, wherein the manual intervention corresponds to the testing and the labeling of the selected at least one possible recovery solution based on a user input.

10. The computing device as claimed in claim 6, wherein each of the at least one failure event is identified based on at least one from among missing data, a system delay, and inaccurate results.

11. A non-transitory computer readable storage medium storing instructions for automatically selecting and executing solutions on a target application, the instructions comprising executable code which, when executed by a processor, causes the processor to:

identify at least one failure event associated with the target application based on monitoring of the target application;

classify each of the identified at least one failure event as one from among a labeled failure event and an unlabeled failure event;

select at least one recovery solution for the labeled failure event from at least one recovery database; and automatically execute the selected at least one recovery solution on the target application for the labeled failure event, wherein when executed by the processor, the executable code further causes the processor to:

select at least one possible recovery solution for the unlabeled failure event from the at least one recovery database;

test and execute the selected at least one possible recovery solution on the target application; and label the selected at least one possible recovery solution on the target application for the unlabeled failure event based on a successful result of the testing and execution of the selected at least one possible recovery solution on the target application.

12. The storage medium as claimed in claim 11, wherein each of the identified at least one failure event is classified as one from among the labeled failure event and the unlabeled failure event based on output of a machine learning model.

13. The storage medium as claimed in claim 11, wherein the selected at least one recovery solution for the labeled failure event is executed without a manual intervention for a resolution of the labeled failure event, and the resolution of the labeled failure event occurs automatically based on the selected at least one recovery solution.

14. The storage medium as claimed in claim 11, wherein the selected at least one possible recovery solution for the unlabeled failure event requires a manual intervention for a resolution of the unlabeled failure event, and the resolution of the unlabeled failure event occurs based on a result of the testing and the labeling of the selected at least one possible recovery solution, wherein the manual intervention corresponds to the testing and the labeling of the selected at least one possible recovery solution based on a user input.

15. The storage medium as claimed in claim 11, wherein each of the at least one failure event is identified based on at least one from among missing data, a system delay, and inaccurate results.

* * * * *